United States Patent
Kang et al.

(10) Patent No.: US 9,723,644 B2
(45) Date of Patent: Aug. 1, 2017

(54) ACCESS POINT AND CONTROL METHOD THEREOF

(71) Applicant: SAMSUNG ELECTRONICS CO., LTD., Suwon-si (KR)

(72) Inventors: Jun-Seok Kang, Incheon (KR); Hyun-koo Kang, Yongin-si (KR); Chang-yong Kim, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 101 days.

(21) Appl. No.: 14/738,327

(22) Filed: Jun. 12, 2015

(65) Prior Publication Data
US 2016/0080314 A1    Mar. 17, 2016

(30) Foreign Application Priority Data

Sep. 17, 2014 (KR) .................. 10-2014-0123620

(51) Int. Cl.
*H04W 88/08* (2009.01)
*H04W 76/02* (2009.01)
*H04L 29/12* (2006.01)

(52) U.S. Cl.
CPC ....... *H04W 76/023* (2013.01); *H04L 61/2015* (2013.01); *H04W 88/08* (2013.01)

(58) Field of Classification Search
None
See application file for complete search history.

(56) References Cited

U.S. PATENT DOCUMENTS

| 7,742,442 B2 * | 6/2010 | Lundsgaard ........ H04L 12/1863 370/312 |
| 2002/0021689 A1 * | 2/2002 | Robbins ............ H04L 29/12301 370/352 |
| 2003/0105841 A1 * | 6/2003 | Miyake ............. H04L 29/12009 709/220 |
| 2004/0103204 A1 * | 5/2004 | Yegin ..................... H04L 69/24 709/229 |

(Continued)

FOREIGN PATENT DOCUMENTS

| JP | 2006-93751 A | 4/2006 |
| KR | 10-2014-0027593 A | 3/2014 |

OTHER PUBLICATIONS

Communication issued Jan. 26, 2016, issued by the European Patent Office in counterpart European Patent Application No. 15181831.7.

*Primary Examiner* — Robert C Scheibel
(74) *Attorney, Agent, or Firm* — Sughrue Mion, PLLC

(57) ABSTRACT

Provided herein is an access point including a communicator configured to communicate with an external electronic apparatus; and a controller configured to, in response to determining that a preset first electronic apparatus is connected to the communicator, provide a signal for requesting connection between a second electronic apparatus connected to another access point and the first electronic apparatus to the another access point based on a type of an IP address (Internet Protocol) allocated to the access point, and form a single network with the another access point based on a signal in response to the connection request signal, thereby providing a user with convenience in communication connection with the electronic apparatus.

18 Claims, 10 Drawing Sheets

(56) References Cited

U.S. PATENT DOCUMENTS

| | | | |
|---|---|---|---|
| 2007/0253344 A1 | 11/2007 | Frost et al. | |
| 2007/0268506 A1* | 11/2007 | Zeldin | H04L 41/0806 358/1.13 |
| 2010/0111055 A1 | 5/2010 | Chiu et al. | |
| 2010/0238860 A1* | 9/2010 | Ota | H04W 64/003 370/328 |
| 2010/0274913 A1* | 10/2010 | Ando | H04W 12/06 709/229 |
| 2012/0051324 A1* | 3/2012 | Hwang | H04W 36/0055 370/331 |
| 2013/0007233 A1* | 1/2013 | Lv | H04L 61/2038 709/222 |
| 2014/0022942 A1 | 1/2014 | Han et al. | |
| 2014/0250513 A1* | 9/2014 | Cao | H04L 63/08 726/7 |

* cited by examiner

100

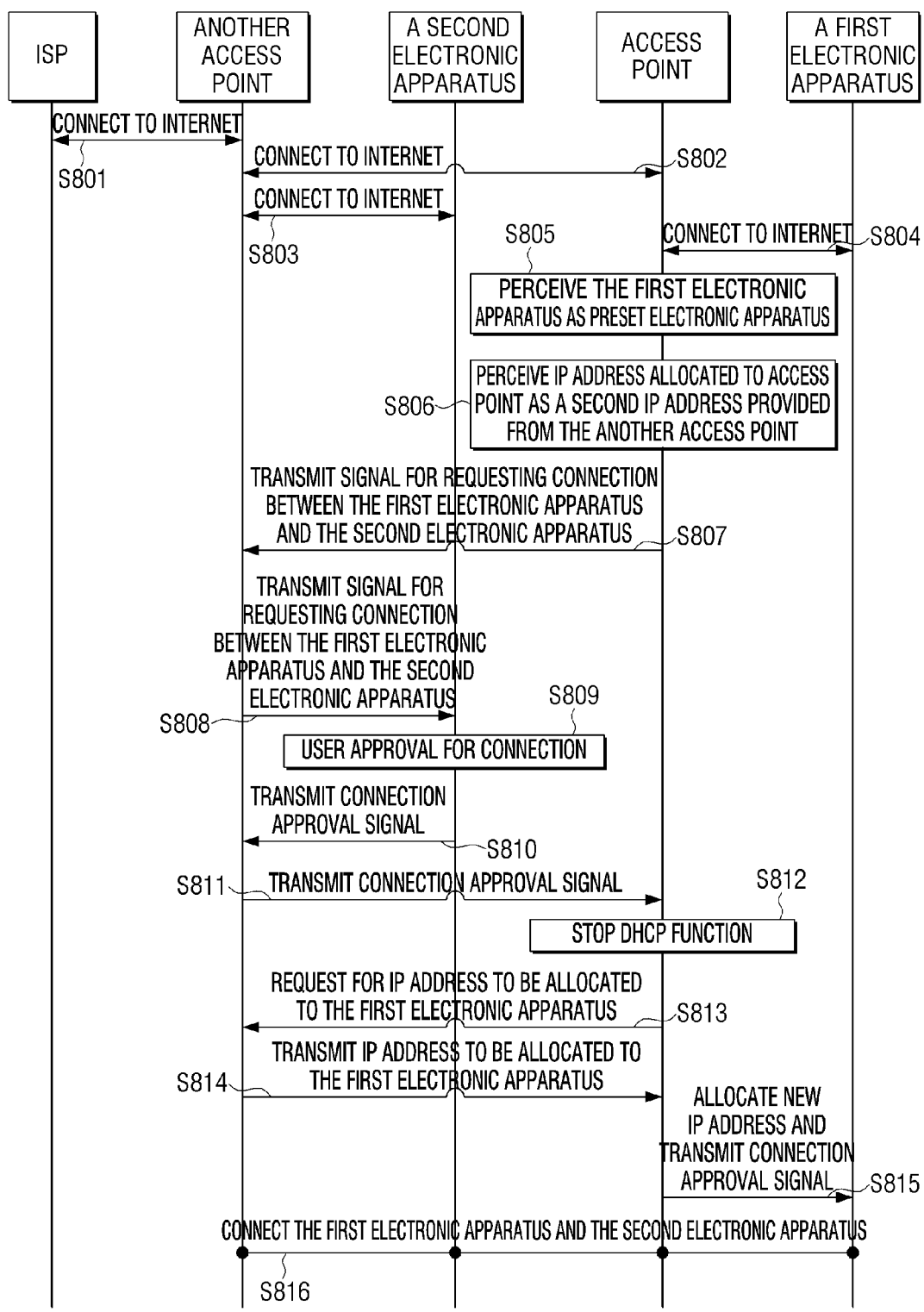

ACCESS POINT AND CONTROL METHOD THEREOF

CROSS-REFERENCE TO RELATED APPLICATION

This application claims priority from Korean Patent Application No. 10-2014-0123620 filed in the Korean Intellectual Property Office on Sep. 17, 2014, the disclosure of which is incorporated herein by reference in its entirety.

BACKGROUND

1. Field

Methods and apparatuses consistent with exemplary embodiments relate to an access point and a control method thereof, and more particularly, to an access point connected to another access point and an external electronic apparatus, and a control method thereof.

2. Description of the Related Art

Due to the recent rapid development of wireless network technologies, it has become possible to connect numerous wireless apparatuses to an internet network through access points (APs). As various kinds of wireless devices become widespread and wireless functions are added to conventional electronic devices, a plurality of accesses points are being used.

When using a plurality of access points, the plurality of access points may each construct an independent sub net or form a single network according to the connecting method.

FIG. 1A is a view illustrating a case in which each access point constructs an independent sub net.

According to FIG. 1A, access points 1 and 2 are both connected to the Internet through a WAN (wide area network) Port. An access point may have a WAN Port or LAN (local area network) Port, and in a case of being connected to the Internet through the WAN Port, a DHCP (Dynamic Host Configuration Protocol) function inside the access point operates to allocate an IP (Internet Protocol) address to an electronic apparatus connected to the LAN Port.

In each access point, the DHCP function operates to construct a sub net that is independent from one another. Furthermore, an IP address is allocated to each electronic apparatus connected to an access point, and thus communication cannot be made between electronic apparatuses connected to different access points, thereby causing user inconvenience.

FIG. 1B is a view illustrating a case in which a plurality of access points form a single network.

In this case, access point 1 is connected to an Internet Service Provider (ISP) and WAN Port to construct an independent sub net, but in access point 2, the Internet is connected from a LAN Port of access point 1 to a LAN Port of access point 2, thereby not constructing an independent sub net. Furthermore, an electronic apparatus connected to access point 2 will be allocated with an IP address by access point 1, and thus access point 2 may communicate with an electronic apparatus connected to access point 1. Such a connecting method is called a Bridge Mode wherein access point 1 operates as a master and access point 2 operates as a slave.

However, in order to configure such a single network, the DHCP function inside access point 2 must be stopped, and access point 2 must be connected to access point 1 using the LAN Port of access point 2. Therefore, there occurs a problem that a user needs special knowledge on manipulation and network construction.

SUMMARY

Therefore, one or more exemplary embodiments provide, in a case in which a plurality of access points construct an independent sub net, an access point capable of easily forming a single network so that communication may be made between a plurality of electronic apparatuses, and a control method thereof.

According to an aspect of an exemplary embodiment, there is provided an access point including a communicator configured to communicate with a first electronic apparatus; and a controller configured to, in response to determining that a first electronic apparatus is preset and that the first electronic apparatus is connected to the communicator, provide a connection request signal to the another access point requesting connection between a second electronic apparatus, which is connected to the another access point, and the first electronic apparatus, based on a type of an IP (Internet Protocol) address allocated to the access point, and form a single network with the another access point based on a response signal received in response to the connection request signal.

The controller may be configured to determine whether the type of the IP address allocated to the access point is a first type, provided from an internet service provider, or a second type, provided from the another access point, and in response to the IP address allocated to the access point being determined as the second type, provide the connection request signal to the another access point.

The controller may be configured to, in response to the response signal received from the another access point being a connection approval signal, form a single network with the another access point.

The controller may be configured to change a sub net formed by the access point to a sub net formed by the another access point in order to form the single network.

The controller may be configured to change the IP address of the first electronic apparatus to an IP address provided from the another access point to form the single network.

The controller may be configured to stop an internal DHCP (Dynamic Host Configuration Protocol) server, and change an IP address allocated to the first electronic apparatus to an IP address provided from the another access point, to form the single network.

The access point may further include a storage configured to store reference information of IP addresses, and wherein the controller is further configured to determine whether the IP address allocated to the access point is a first type or a second type based on the reference information stored in the storage.

The IP address may be allocated by DHCP technology.

The controller may be configured to determine whether an electronic apparatus connected to the communicator is the first electronic apparatus that is preset based on at least one of a manufacturer, a product type, and a product name.

According to an aspect of an exemplary embodiment, there is provided a method for controlling an access point, the method including: in response to determining that a first electronic apparatus is preset and connected to a communicator, providing a connection request signal to another access point for requesting connection between a second electronic apparatus, which is connected to the another access point, and the first electronic apparatus, based on a type of an IP (Internet Protocol) address allocated to the access point; and forming a single network with the another access point based on a response signal received in response to the connection request signal.

The providing the connection request signal for requesting connection to the another access point may include determining whether the type of the IP address allocated to the access point is a first type, provided from an internet service provider, or a second type, provided from another access point, and in response to the IP address allocated to the access point being determined as the second type, providing the connection request signal to the another access point.

The forming a single network may include forming a single network with the another access point in response to the response signal received from the another access point being a connection approval signal.

The forming a single network may include changing a sub net formed by the access point to a sub net formed by the another access point to form the single network.

The forming a single network may include changing the IP address of the first electronic apparatus to an IP address provided from the another access point to form the single network.

The forming a single network may include stopping an internal DHCP (Dynamic Host Configuration Protocol) server, and changing an IP address allocated to the first electronic apparatus to an IP address provided from the another access point, to form the single network.

The providing the connection request signal for requesting connection to the another access point may include determining whether the IP address allocated to the access point is a first type or a second type based on reference information of IP addresses.

The method may include determining whether an electronic apparatus connected to the communicator is the first electronic apparatus that is preset based on at least one of a manufacturer, a product type, and a product name.

According to an aspect of an exemplary embodiment, there is provided a method for controlling an access point, the method including determining whether an IP (Internet Protocol) address allocated to the access point is a first type of IP address, provided from an internet service provider, or a second type of IP address, provided from another access point; and in response to determining that the IP address allocated to the access point is the second type of IP address, providing a connection request to the another access point requesting a connection between a first electronic apparatus and a second electronic apparatus; and in response to receiving an approval response of the connection request, stopping a DHCP (Dynamic Host Configuration Protocol) function and facilitating the connection between the first electronic apparatus and the second electronic apparatus.

The facilitating the connection between the first electronic apparatus and the second electronic apparatus may include forming a single network between the access point and the another access point.

The forming the single network may include changing a sub net formed by the access point to a sub net formed by the another access point to form the single network.

According to the aforementioned exemplary embodiments, it is possible to enable a plurality of access points constructing an independent sub net to form a single network more easily.

BRIEF DESCRIPTION OF THE DRAWINGS

The above and/or other aspects will be more apparent by describing exemplary embodiments with reference to the accompanying drawings, in which:

FIG. 8 is a sequence view illustrating a process of forming a single network of an access point according to an exemplary embodiment.

DETAILED DESCRIPTION

Figure 1A:
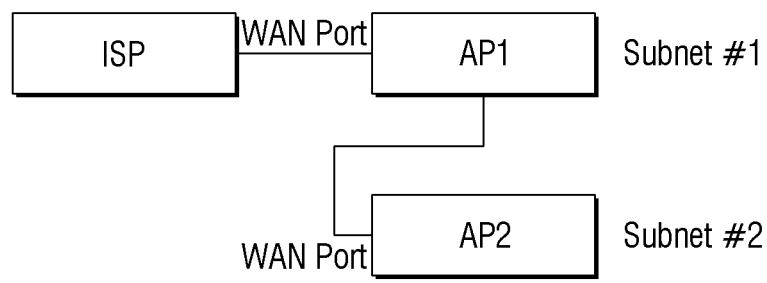
FIGS. 1A and 1B are views illustrating methods for connecting a plurality of access points.
Figure 1B:
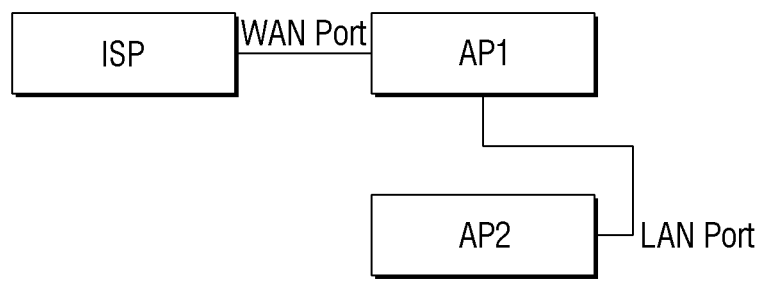

Exemplary embodiments are described in detail below with reference to the accompanying drawings.

In the following description, like drawing reference numerals are used for like elements throughout the drawings. The matters defined in the description, such as detailed construction and elements, are provided to assist in a comprehensive understanding of exemplary embodiments. However, exemplary embodiments can be practiced without those specifically defined matters. Also, well-known functions or constructions may not be described in detail if they would obscure the application with unnecessary detail.

Figure 2A:
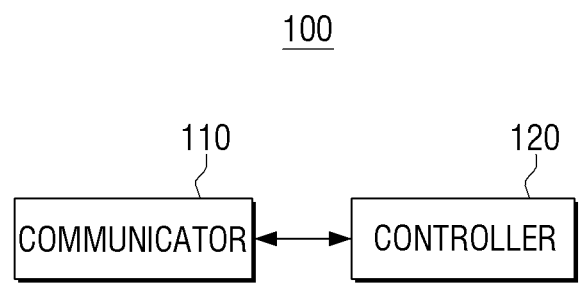
FIGS. 2A and 2B are block diagrams illustrating a configuration of an access point according to an exemplary embodiment.
Figure 2B:
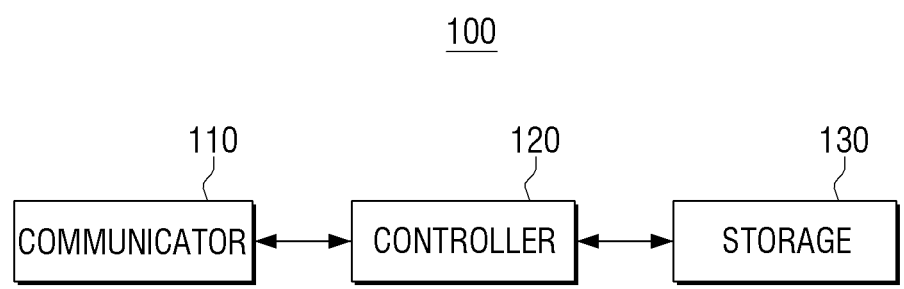

FIGS. 2A and 2B are block diagrams illustrating a configuration of an access point 100 according to an exemplary embodiment.

According to an exemplary embodiment illustrated in FIG. 2A, the access point 100 includes a communicator 110 and controller 120.

The access point 100 is connected to a wireless apparatus or electronic apparatus by wire or wirelessly to allow the wireless apparatus or electronic apparatus to be connected to a network. Herein, the network may be the Internet.

Furthermore, the access point 100 may communicate with the wireless apparatus and electronic apparatus wirelessly to transmit data provided from the network to the wireless apparatus and electronic apparatus, and transmit data received from the wireless apparatus and electronic apparatus to a destination in the network through a router connected by wire.

The communicator 110 may communicate with an internet service provider, another access point, or external electronic apparatus. Furthermore, the communicator 110 may be divided into a WAN Port and LAN Port for wired connection, or the communicator 110 may be connected wirelessly. Explanation of the WAN Port and LAN Port will be made in detail hereinafter with reference to FIG. 3.

Meanwhile, the communicator 110 may be connected to a first electronic apparatus wirelessly. The first electronic apparatus transmits a probe request signal to let others know of its existence. In this case, the probe request signal may include information about the first electronic apparatus.

When the communicator 110 receives the probe request signal transmitted by the first electronic apparatus, the communicator 110 becomes aware that the first electronic apparatus is nearby, and may obtain information about the first electronic apparatus from the probe request signal.

Furthermore, the communicator 110 transmits a probe response signal to the first electronic apparatus. In this case, the probe response signal may include SSID, MAC address, and network setting information of the access point 100, etc. Operations to be performed after the access point 100 is connected to the first electronic apparatus will be explained hereinafter with regard to the controller 120.

When the first electronic apparatus is connected to the access point 100, the controller 120 determines whether the first electronic apparatus is a preset electronic apparatus. Herein, the controller 120 may determine whether the electronic apparatus connected to the communicator 110 is a preset first electronic apparatus based on at least one of a manufacturer, product type and product name. If it is determined that the electronic apparatus connected to the communicator 110 is not a preset first electronic apparatus, the access point 100 may not perform any operation.

If it is determined that the electronic apparatus connected to the communicator 110 is a preset first electronic apparatus, the controller 120 determines a type of an IP address (Internet Protocol) allocated to the access point 100. More specifically, the controller 120 determines whether the IP address allocated to the access point 100 is a first IP address provided from the internet service provider or a second IP address provided from another access point.

If the IP address allocated to the access point 100 is the first IP address provided from the internet service provider, then the IP address is a certified IP address, which means that the Internet is connected from the internet service provider through the WAN Port of the access point 100. On the other hand, if the IP address allocated to the access point 100 is the second IP address provided from another access point means that the IP address is a proprietary IP address, that is a proprietary IP address allocated by a DHCP service inside the another access point, meaning that the Internet is connected from the another access point through the WAN Port of the access point 100.

In the case in which the first IP address is allocated, since the access point 100 is directly connected from the internet service provider, there is no need for additional control. On the other hand, in the case in which the second IP address is allocated, there is another access point besides the access point 100, and thus it is necessary to construct a single network for connection with the second electronic apparatus connected to the another access point.

Therefore, in response to the IP address allocated to the access point 100 being the second IP address, the controller 120 may transmit a signal to the another access point for requesting connection between the second electronic apparatus connected to the another access point and the first electronic apparatus. In response to receiving a connection reject signal or receiving no response signal within a predetermined time in response to the connection request signal, the controller 120 may not perform any operation.

In response to receiving a connection approval signal in response to the connection request signal, the controller 120 may change a sub net formed by the access point 100 to a sub net formed by the another access point and form a single network.

More specifically, the controller 120 may stop an internal DHCP (Dynamic Host Configuration Protocol) server, and change an IP address preallocated to an electronic apparatus connected to the access point 100 to an IP address provided from the another access point, and form a single network.

Meanwhile, after the single network is configured, the controller 120 may transmit a connection approval signal to the first electronic apparatus connected to the access point 100, and relay communication between the first electronic apparatus and second electronic apparatus.

According to another exemplary embodiment, disclosed in FIG. 2B, the access point 100 may include a communicator 110, controller 120, and storage 130. Explanation about the communicator 110 and controller 120 is the same as above, and thus only the storage 130 will be explained hereinafter.

In the storage 130, information about the preset first electronic apparatus may be stored. The storage 130 may be storing information based on at least one of the manufacturer, product type and product name.

Furthermore, the storage 130 may be storing IP address reference information. The IP address reference information may be information for differentiating whether the IP address is a first IP address or a second IP address. More specifically, the IP address reference information may be information for differentiating whether the IP address is a certified IP address or proprietary IP address, and since a certified IP address means all IP addresses except for proprietary IP addresses, and because there are so many IP addresses, the storage 130 may include only the information about specifically determined proprietary IP addresses. Accordingly, if an IP address is not a proprietary IP address, that IP address may be determined as a certified IP address, according to an exemplary embodiment. That is, the storage 130 may include information about all certified IP addresses.

Proprietary IP addresses may be classified into classes such as A class, B class, and C class, wherein, as an example, A class may allocate IP addresses within a range of 10.0.0.0~10.255.255.255, B class may allocate IP addresses within a range of 172.16.0.0~172.31.255.255, and C class may allocate IP addresses within a range of 192.168.0.0~192.168.255.255.

Meanwhile, the controller 120 may determine whether the IP address allocated to the access point 110 is a first IP address or second IP address based on the IP address reference information stored in the storage.

Figure 3:
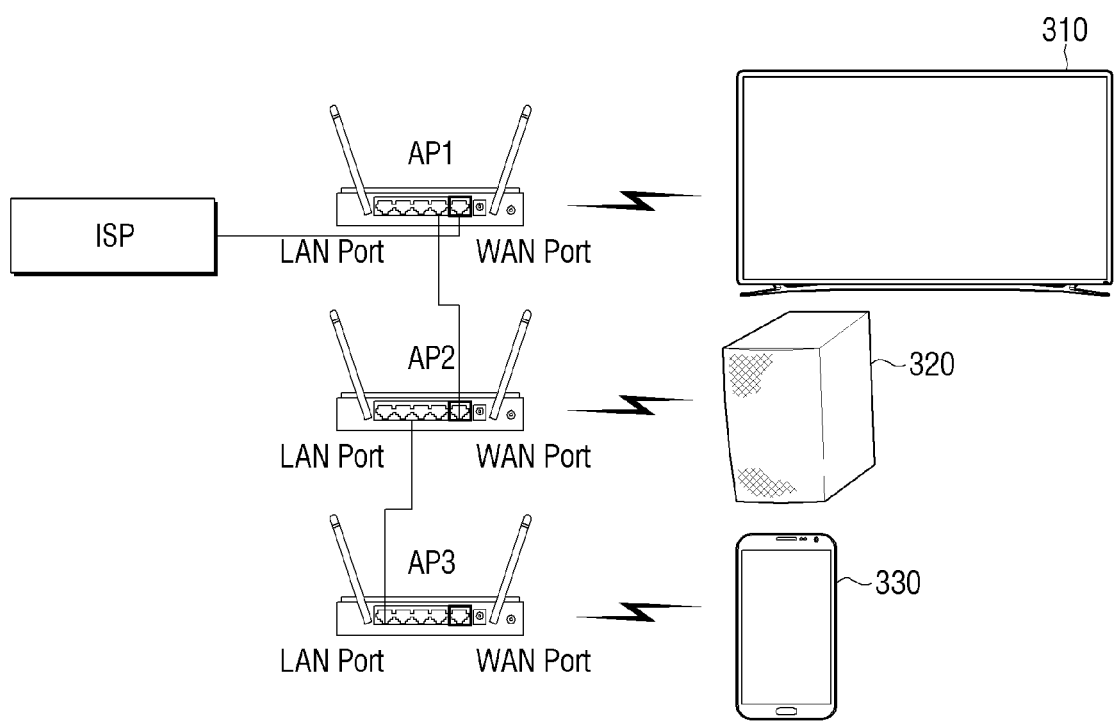
FIG. 3 is a view illustrating a method for connecting access points according to an exemplary embodiment.

FIG. 3 is a view illustrating a method for connecting an access point 100 according to an exemplary embodiment.

The access point 100 may be divided into a WAN Port and LAN Port. In response to the access point 100 being connected to the internet service provider through the WAN Port of the access point 100, the DHCP function inside the access point 100 may operate, and may directly allocate the IP address to the first electronic apparatus connected to the LAN Port.

Meanwhile, in response to the access point 100 being connected to the internet service provider through the LAN Port of the access point 100, the DHCP function inside the access point 100 may not operate, but allocate the IP address provided from the internet service provider to the first electronic apparatus connected to the LAN Port of another access point 100. Herein, in response to the access point 100 being connected to the internet service provider, the internet service provider provides the IP address, and in response to the access point 100 being connected to the WAN Port of another access point, the another access point provides the IP address. However, in response to the access point 100 being connected to the LAN Port of the another access point, the DHCP function inside the another access point may not operate either, and thus the IP address will be allocated from a provider that provides internet services to the another access point or from another access point. Meanwhile, the aforementioned IP address may be allocated by the DHCP technology.

According to FIG. 3, access point 1 (AP1) is connected through the WAN Port of access point 1 from the internet service provider (ISP), and access point 2 (AP2) is connected through the WAN Port of access point 2 from the LAN Port of access point 1, and each constructs an independent sub net. Therefore, a TV 310 will be allocated with an IP address by access point 1, and a wireless speaker 320 will be allocated with an IP address by access point 2. Furthermore, the TV 310 and wireless speaker 320 each exist on an independent sub net constructed by access point 1 and access point 2, and thus cannot communicate with each other.

Meanwhile, access point 3 (AP3) is connected through the LAN Port of access point 3 from the LAN Port of access point 2, and thus access point 2 and access point 3 form a single network. Therefore, a mobile terminal 330 will be allocated with an IP address from access point 2, and the portable terminal 330 will exist on the same sub net as the wireless speaker 320, and thus the two apparatuses may communicate with each other.

Meanwhile, each of access points 2 and 3 is allocated with an IP address from access points 1 and 2, and is allocated with the second IP address provided from the another access point, that is a proprietary IP address, but access point 1 is allocated with an IP address from the internet service provider, the first IP address, that is a certified IP address. Using this difference, each access point is able to determine whether another higher access point is connected.

Furthermore, in response to determining that access point 2 is allocated with the second IP address, the wireless speaker 320 is connected, and a signal for requesting connection will be transmitted to the TV 310 connected to access point 1. The TV 310 that received the signal for requesting connection may provide a UI for the user to decide whether to make a connection.

Furthermore, in response to the mobile terminal 330 being connected to access point 3, even when connected to access point 3, an IP address will be allocated by access point 2, and access point 2 will determine the IP address allocated to it. Furthermore, in response to determining that access point 2 is allocated with the second IP address, the mobile terminal 330 will be connected, and a signal for requesting connection will be transmitted to the TV 310 connected to access point 1. The TV 310 that received the signal for requesting connection provides a UI for the user to decide whether to make a connection. This will be explained in further detail with reference to FIG. 4.

Figure 4:
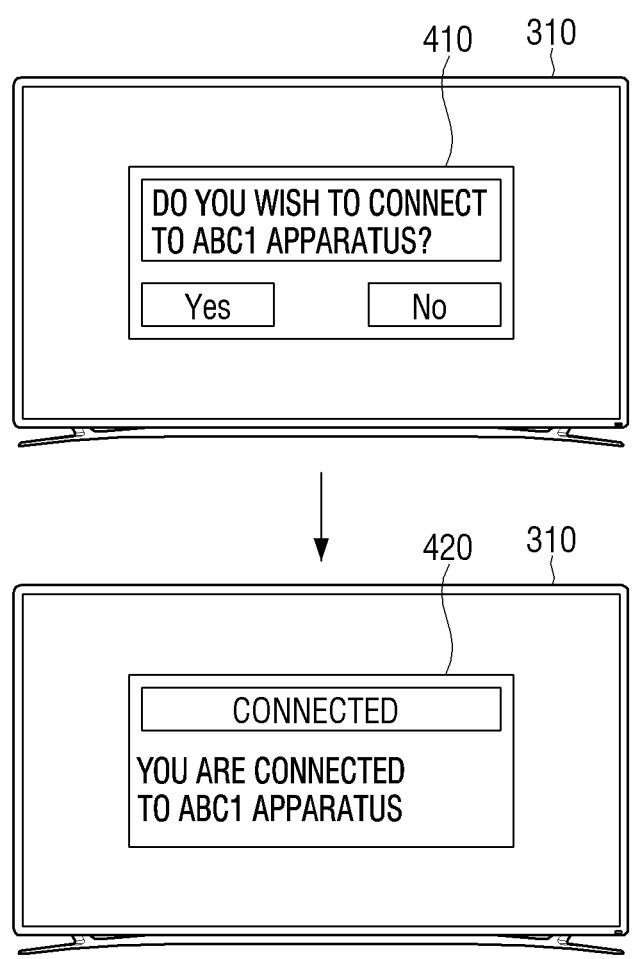
FIG. 4 is a view illustrating a method of asking whether to interlock a first electronic apparatus and a second electronic apparatus according to an exemplary embodiment.

FIG. 4 is a view illustrating a method for asking whether to interlock a first electronic apparatus and second electronic apparatus according to an exemplary embodiment.

According to an exemplary embodiment illustrated in FIG. 4, the TV 310 that received a signal for requesting connection may provide a message 410 asking the user whether to make a connection. Herein, an apparatus name, e.g., ABC1, of the first electronic apparatus may be, but without limitation, displayed on the TV 310 corresponding to the second electronic apparatus. A name that the user had previously set or a name of the apparatus that the manufacturer had set at the time of manufacturing the apparatus may be displayed instead. On the bottom part of the message 410 asking whether to make a connection, a menu may be provided such that the user may make a connection command.

If the user wishes to connect to the first electronic apparatus, he/she may input a connection approval command. However, if the first electronic apparatus is an electronic apparatus that has nothing to do with the user, for example, if the message 410 is one that asks whether to make a connection as a neighboring electronic apparatus is connected, the user may input a connection reject command and stop the connection between the first electronic apparatus and second electronic apparatus, in which case, the access point 100 will not form a single network with the another access point.

If the user does not want to connect to the first electronic apparatus, he/she may input a connection reject command, but if there is no input for a predetermined period of time, it may be deemed to have been rejected.

Meanwhile, when the user inputs the connection approval command, a connection approval message 420 may be displayed on the TV 310.

Herein, the apparatus name of the first electronic apparatus connected to the TV 310 may be, without limitation, displayed on the TV 310. A name of the apparatus set by the user or the manufacturer may be displayed instead.

Furthermore, in an exemplary embodiment, a TV 310 is used, but the message 410 asking whether to make a connection or a connection approval message 420 may be displayed on another device, or even provided by voice sound.

Meanwhile, the user may set the menu not to display the message 410 asking whether to make a connection. That is because if the message 410 asking whether to connect to an electronic apparatus is displayed every time a predetermined electronic apparatus is connected to the access point 100, the user may be interrupted.

Figure 5:
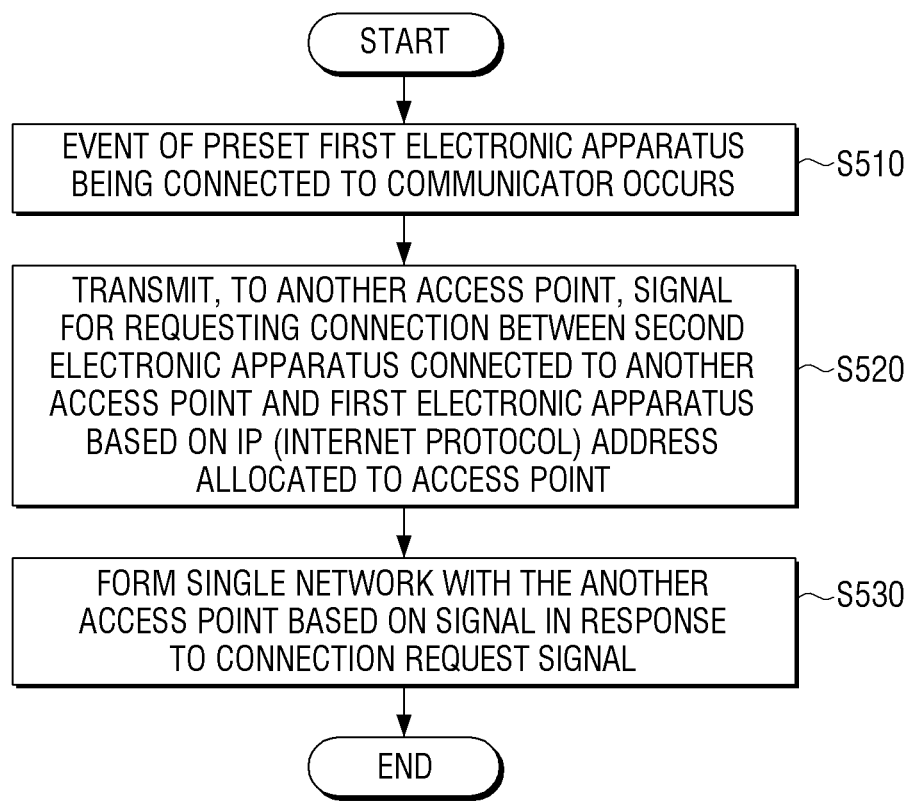
FIG. 5 is a flowchart illustrating a process of forming a single network of an access point according to an exemplary embodiment.

FIG. 5 is a flowchart illustrating a process of forming a single network of an access point according to an exemplary embodiment.

First, an event occurs in which a preset first electronic apparatus is connected to a communicator (S510). If the first electronic apparatus is not a preset apparatus, the process of forming a single network of the access point will not proceed.

Next, a signal for requesting connection between the first electronic apparatus and the second electronic apparatus connected to another access point is transmitted to the another access point based on an IP address type allocated to the access point (S520). The process of determining the IP address type allocated to the access point is made based on whether the IP address is a certified IP address or a proprietary IP address. If the access point is a certified IP address, the signal for requesting connection between the first electronic apparatus and the second electronic apparatus connected to the another access point may not be transmitted to the another access point, but may be transmitted to an apparatus connected to the access point besides the first electronic apparatus.

Next, a single network is formed with the another access point based on a signal in response to the signal for requesting connection (S530).

Furthermore, transmitting a signal for requesting connection to the another access point (S520) involves determining whether the IP address allocated to the access point is the first IP address provided from the internet service provider or the second IP address provided from the another access point, and in response to the IP address allocated to the access point being determined as the second IP address, a signal for requesting connection may be transmitted to the another access point.

The forming a single network with the another access point (S530) may involve forming a single network with the another access point in response to the response signal received from the another access point being a connection approval signal in response to the signal for requesting connection.

The forming a single network with the another access network (S530) may involve changing a sub net formed by the access point to a sub net formed by the another access point and forming a single network.

The forming a single network with the another access point (S530) may involve changing an IP address preallocated to the electronic apparatus to an IP address provided from the another access point and forming a single network.

The forming a single network with the another access point (S530) may involve stopping the internal DHCP (Dynamic Host Configuration Protocol) server, and changing an IP address preallocated to the electronic apparatus connected to the access point to an IP address provided from the another access point, and forming a single network.

The transmitting a signal for requesting connection to the another access point (S520) may involve determining whether the IP address allocated to the access point is the first IP address or the second IP address based on the IP address reference information stored in the storage, and in response to the IP address allocated to the access point being determined as the second IP address, a signal for requesting connection may be transmitted to the another access point.

The step in which the event of the preset first electronic apparatus being connected to the communicator occurs (S510) involves determining whether the electronic apparatus connected to the communicator is the preset first electronic apparatus based on at least one of the manufacturer, product type, and product name.

Figure 6:
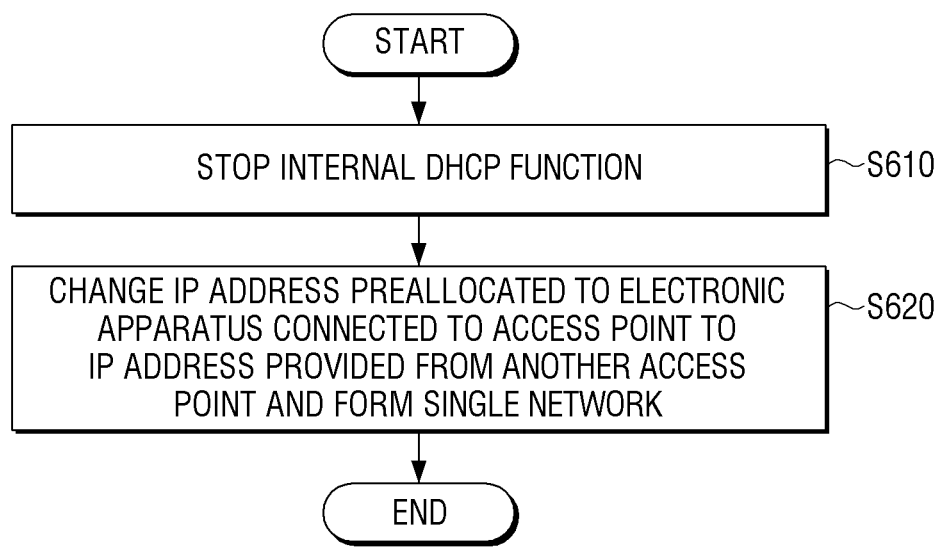
FIG. 6 is a flowchart illustrating a method for forming a single network of an access point according to an exemplary embodiment.

FIG. 6 is a flowchart illustrating a specific method for forming a single network of an access point according to an exemplary embodiment.

First, the access point 100 stops its internal DHCP function (S610). Due to this, no more new IP addresses will be directly allocated to the electronic apparatus connected to the access point 100. Furthermore, an IP address preallocated to the electronic apparatus connected to the access point 100 is changed to an IP address provided from the another access point (S620). Herein, the preallocated IP address refers to the IP address allocated to the electronic apparatus connected to the access point 100 directly by the access point 100.

Meanwhile, the access point 100 may request the another access point to provide a new IP address, and reallocate the new IP address provided from the another access point to the electronic apparatus connected to the access point to change the IP address and form a single network.

However, the method of forming a single network of FIG. 6 is merely an exemplary embodiment. The single network may be embodied in a method of newly mapping an IP address in the process of going through the access point without having to change the IP address of the electronic apparatus connected to the access point.

Figure 7:
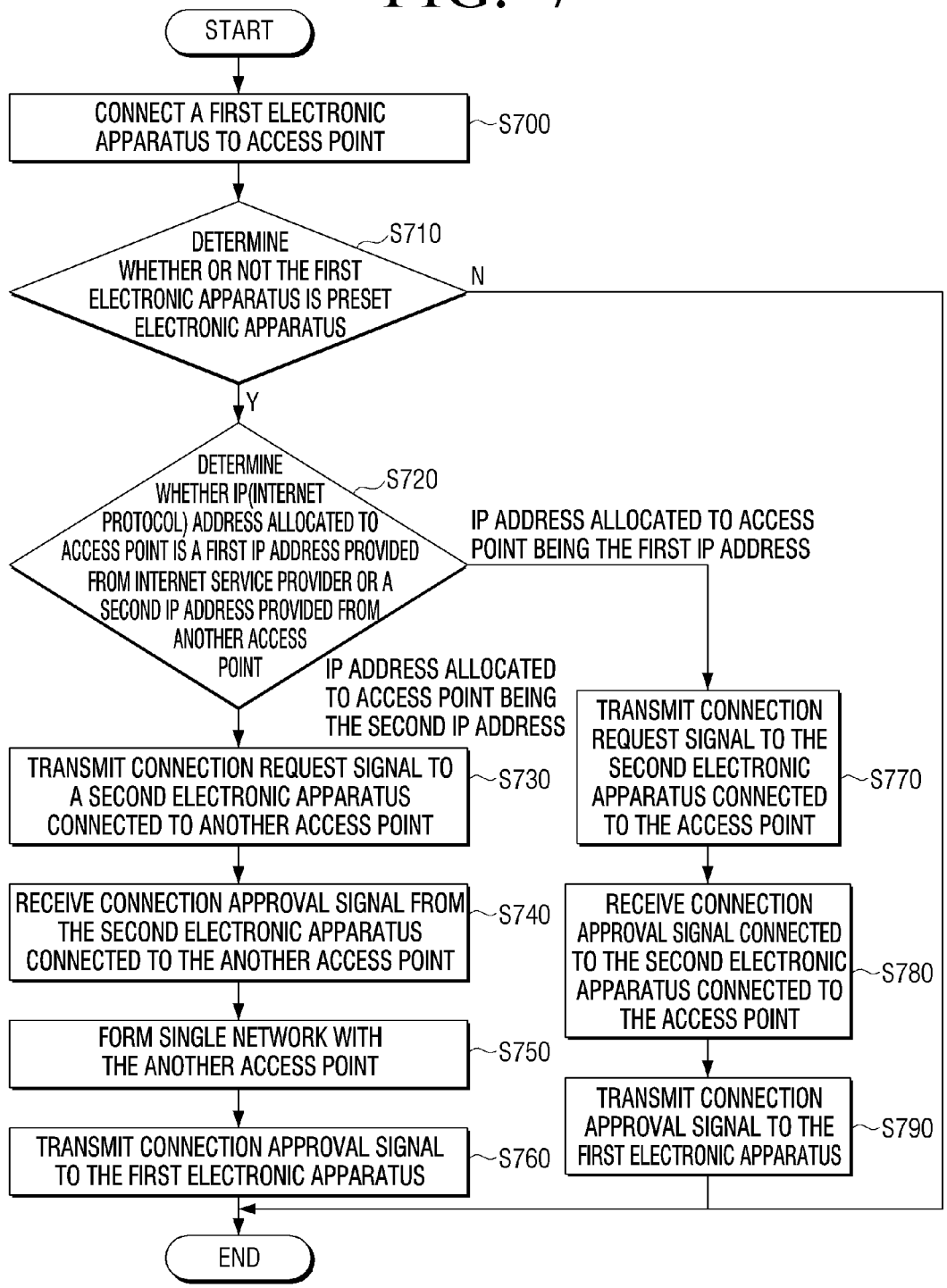
FIG. 7 is a flowchart illustrating a process of forming a single network of an access point according to another exemplary embodiment.

FIG. 7 is a flowchart illustrating the process of forming a single network of an access point according to another exemplary embodiment.

First, a first electronic apparatus is connected to the access point 100 (S700). Next, the access point 100 determines whether the first electronic apparatus is a preset electronic apparatus (S710). If the first electronic apparatus is not connected to the access point 100, or if it is determined that the first electronic apparatus is not a preset electronic apparatus, the access point 100 will not perform any operation and will not form a single network.

Meanwhile, in response to the first electronic apparatus being determined as a preset electronic apparatus, it is determined whether the IP address allocated to the access point 100 is the first IP address provided from the internet service provider or the second IP address provided from the another access point (S720). The process of determining the type of the IP address proceeds only when the first electronic apparatus is a preset electronic apparatus, and thus, if the first electronic apparatus is not a preset electronic apparatus, the type of IP address is not determined. Furthermore, it is possible to determine the IP address type using the IP address reference information stored in the storage 130. There may be information about proprietary IP addresses stored in the IP address reference information.

If the IP address allocated to the access point 100 is determined as the second IP address, it is determined that another access point is connected to the access point and that the access point 100 constructs a sub net independent from the another access point. Therefore, in order to connect to the second electronic apparatus connected to the another access point, a connection request signal will be transmitted to the second electronic apparatus connected to the another access point (S730).

Furthermore, in response to a connection approval being input by the user who have been using the electronic apparatus, the access point 100 receives a connection approval signal from the second electronic apparatus connected to the another access point (S740). In response to receiving the connection approval signal, the access point 100 forms a single network with the another access point (S750), and transmits the connection approval signal to the first electronic apparatus (S760).

Meanwhile, if the IP address allocated to the access point 100 is determined as the first IP address, then another access point is not connected to the access point 100, and it is determined that the access point 100 is directly connected to the internet service provider. Therefore, when a connection request signal is transmitted to the second electronic apparatus connected to the access point (S770), and the connection request signal is received from the second electronic apparatus connected to the access point (S780), a connection approval signal will be transmitted to the first electronic apparatus (S790). In such a case, the access point 100 will not proceed to the process of forming a single network.

FIG. 8 is a sequence for explaining a process of forming a single network of an access point according to an exemplary embodiment.

First of all, an internet service provider, access point 100, another access point, and second electronic apparatus are connected to the Internet (S801, S802, S803). Furthermore, the first electronic apparatus is connected to the access point 100 (S804). Herein, the first electronic apparatus may be distanced from the another access point physically and thus may not be connectable.

Next, the access point 100 determines whether the first electronic apparatus is a preset electronic apparatus. In response to the first electronic apparatus being determined as a preset electronic apparatus (S805), it is determined whether the IP address allocated to the access point 100 is a first IP address provided from the internet service provider or a second IP address provided from the another access point. On the other hand, in response to the first electronic apparatus being determined as not being the preset electronic apparatus, the access point 100 may not perform any operation.

Meanwhile, in response to the IP address allocated to the access point 100 being determined as the second IP address provided from the another access point (S806), a signal for requesting connection between the first electronic apparatus and the second electronic apparatus connected to the another access point is transmitted to the another access point (S807), and the another access point transmits the received signal to the second electronic apparatus (S808). On the other hand, if the IP address allocated to the access point 100 is determined as the first IP address provided from the internet service provider, then the access point 100 transmits the connection request signal to the second electronic apparatus connected to the access point 100.

In an exemplary embodiment, it is displayed on the second electronic apparatus that the connection request signal has been received. The user may also be notified by voice sound or any other method. The user then determines whether to approve connection based on which electronic apparatus the connection request signal requests the connection. In some cases, it may be a connection request signal for an electronic apparatus of a neighbor's apparatus rather than the user's electronic apparatus. Therefore, in some cases, the user may reject connection.

When there is a connection approval by the user (S809), the second electronic apparatus transmits a connection approval signal to the another access point (S810), and the another access point transmits the received signal to the access point (S811).

The access point that received the connection approval signal first stops the internal DHCP function in order to connect the first electronic apparatus and second electronic apparatus (S812). Then, the access point requests the another access point for an IP address to be allocated to the first electronic apparatus (S813), and receives the IP address to be allocated to the first electronic apparatus from the another access point (S814).

Then, the access point 100 allocates to the first electronic apparatus a new IP address provided, changes the IP address of the first electronic apparatus, integrates each sub net of the access point 100 and the another access point, forms a single network, and transmits a connection approval signal to the first electronic apparatus (S815).

The first electronic apparatus and the second electronic apparatus are connected to each other through the aforementioned process, and communication therebetween may be made via the access point and the another access point (S816).

By using such an access point 100, even when the first electronic apparatus and second electronic apparatus cannot be connected if each of the first electronic apparatus and second electronic apparatus is connected to the access point 100 and another access point, respectively, and the access point 100 and the another access point each constructs a sub net independent from each other, the access point 100 may form a single network with the another access point, thereby improving user convenience and satisfaction.

Meanwhile, the aforementioned control method of an access point according to an exemplary embodiment may be embodied as a program code that may be executed in a computer and may be stored in various types of non-transitory computer readable medium and provided in each apparatus to be executed by a processor.

For example, there may be provided a non-transitory computer readable medium which stores a program for performing an event in which the preset first electronic apparatus is connected to the communicator, transmitting a signal for requesting connection with the second electronic apparatus connected to another access point and a first electronic apparatus to the another access point based on the type of IP address (Internet Protocol) allocated to the access point, and forming a single network with the another access point based on a signal in response to the connection request signal.

A non-transitory computer readable medium may refer to a computer readable medium where data can be stored semi-permanently, and not only for a short period of time such as a register, cache, or memory and the like. More specifically, various aforementioned applications and programs may be stored in and be provided by a non-transitory computer readable medium such as a CD, DVD, hard disc, blue-ray disc, USB, memory card, and ROM etc.

Although one or more exemplary embodiments have been shown and described, it would be appreciated by those skilled in the art that changes may be made in this embodiment without departing from the principles and spirit of the invention, the scope of which is defined in the claims and their equivalents.

What is claimed is:

1. An access point comprising:
   at least one memory configured to store instructions;
   at least one processor configured to execute the stored instructions to implement:
      a communicator configured to communicate with a first electronic apparatus; and
      a controller configured to:
         determine whether an IP (Internet Protocol) address allocated to the access point is a first type of IP address, provided from an internet service provider, or a second type of IP address, provided from another access point;
         in response to the IP address allocated to the access point being determined as the second type, provide a connection request signal to the another access point requesting connection between the first electronic apparatus and a second electronic apparatus, which is connected to the another access point; and
         form a single network by connecting the access point with the another access point based on a response signal received in response to the connection request signal.

2. The access point according to claim 1,
   wherein the controller is further configured to, in response to the response signal received from the another access point being a connection approval signal, form a single network with the another access point.

3. The access point according to claim 1,
   wherein the controller is further configured to change a sub net formed by the access point to a sub net formed by the another access point in order to form the single network.

4. The access point according to claim 1,
   wherein the controller is further configured to change the IP address of the first electronic apparatus to an IP address provided from the another access point to form the single network.

5. The access point according to claim 1,
   wherein the controller is further configured to stop an internal DHCP (Dynamic Host Configuration Protocol) server, and change an IP address allocated to the first electronic apparatus to an IP address provided from the another access point, to form the single network.

6. The access point according to claim 1,
further comprising a storage configured to store reference information of IP addresses, and
wherein the determining whether the IP address allocated to the access point is a first type or a second type is based on the reference information stored in the storage.

7. The access point according to claim 1,
wherein the IP address is allocated by DHCP technology.

8. The access point according to claim 1,
wherein the controller is further configured to determine whether an electronic apparatus connected to the communicator is the first electronic apparatus that is compatible based on at least one of a manufacturer, a product type, and a product name.

9. A method for controlling an access point, the method comprising:
determining whether an IP (Internet Protocol) address allocated to the access point is a first type of IP address, provided from an internet service provider, or a second type of IP address, provided from another access point;
in response to the IP address allocated to the access point being determined as the second type, providing a connection request signal to the another access point for requesting connection between a first electronic apparatus, which is connected to a communicator of the access point, and a second electronic apparatus, which is connected to the another access point; and
forming a single network by connecting the access point with the another access point based on a response signal received in response to the connection request signal.

10. The method according to claim 9,
wherein the forming a single network comprises forming a single network with the another access point in response to the response signal received from the another access point being a connection approval signal.

11. The method according to claim 9,
wherein the forming a single network comprises changing a sub net formed by the access point to a sub net formed by the another access point to form the single network.

12. The method according to claim 9,
wherein the forming a single network comprises changing the IP address of the first electronic apparatus to an IP address provided from the another access point to form the single network.

13. The method according to claim 9,
wherein the forming a single network comprises stopping an internal DHCP (Dynamic Host Configuration Protocol) server, and changing an IP address allocated to the first electronic apparatus to an IP address provided from the another access point, to form the single network.

14. The method according to claim 9,
wherein the providing the connection request signal for requesting connection to the another access point comprises determining whether the IP address allocated to the access point is a first type or a second type based on reference information of IP addresses.

15. The method according to claim 9, further comprising:
determining whether an electronic apparatus connected to the communicator is the first electronic apparatus that is compatible based on at least one of a manufacturer, a product type, and a product name.

16. A method for controlling an access point, the method comprising:
determining whether an IP (Internet Protocol) address allocated to the access point is a first type of IP address, provided from an internet service provider, or a second type of IP address, provided from another access point;
in response to determining that the IP address allocated to the access point is the second type of IP address, providing a connection request to the another access point requesting a connection between a first electronic apparatus and a second electronic apparatus; and
in response to receiving an approval response of the connection request, stopping a DHCP (Dynamic Host Configuration Protocol) function and facilitating the connection between the first electronic apparatus and the second electronic apparatus.

17. The method of claim 16, wherein the facilitating the connection between the first electronic apparatus and the second electronic apparatus comprises forming a single network between the access point and the another access point.

18. The method of claim 17, wherein the forming the single network comprises changing a sub net formed by the access point to a sub net formed by the another access point to form the single network.

* * * * *